United States Patent [19]

Nudenberg et al.

[11] 3,897,515

[45] July 29, 1975

[54] CYCLIC O,O,S-TRIESTERS OF PHOSPHORODITHIOIC ACID

[75] Inventors: Walter Nudenberg, Newtown, Conn.; Merlin P. Harvey, Denison, Iowa; James Urquhart Mann, Wayne, N.J.

[73] Assignee: Uniroyal, Inc., New York, N.Y.

[22] Filed: July 17, 1974

[21] Appl. No.: 489,295

Related U.S. Application Data

[62] Division of Ser. No. 282,640, Aug. 21, 1972, which is a division of Ser. No. 66,870, Aug. 25, 1970, Pat. No. 3,712,878.

[52] U.S. Cl................................. 260/934; 260/937
[51] Int. Cl.......................................... C07d 105/04

[58] Field of Search............................. 260/934, 937

[56] References Cited
UNITED STATES PATENTS
3,159,664  12/1964  Bartlett............................... 260/937

*Primary Examiner*—Anton H. Sutto
*Attorney, Agent, or Firm*—Robert J. Patterson, Esq.

[57] ABSTRACT

Cyclic O,O,S - Triesters of phosphorodithioic acid are excellent accelerators of sulfur vulcanization at elevated temperatures, thereby making possible a considerable reduction in the cure time. Additionally, certain novel compounds of the above class and their preparation are disclosed.

3 Claims, No Drawings

CYCLIC O,O,S-TRIESTERS OF PHOSPHORODITHIOIC ACID

CROSS-REFERENCES TO RELATED APPLICATIONS

This application is a division of our copending application Ser. No. 282,640, filed Aug. 21, 1972 which in turn is a division of our copending application Ser. No. 66,870, filed Aug. 25, 1970, issued on Jan. 23, 1973 as U.S. Pat. No. 3,712,878.

This invention relates to (1) the use of O,O,S-triesters of phosphorodithioic acid to accelerate the sulfur vulcanization of rubbery elastomers at elevated temperatures (i.e., at approximately 400°F and higher), (2) vulcanizable compositions containing such triesters, (3) improved cured vulcanizates produced in accordance with the foregoing use and (4) many of the triesters themselves as novel compounds.

The O,O,S-triesters of phosphorodithioic acid that are within the invention are the addition products, or adducts, resulting from the addition of cyclic O,O-2,2-dimethyltrimethylene phosphorodithioic acid (hereinafter referred to as DTP for convenience) or homologues across an unsaturated bond, such as, for example, >C = C< , as in styrene or alkene;

—C≡C — , as in phenylacetylene or acetylene;

>C = N — , as in acetoxime;

—N⩘
   >C — , as in benzimidazole;
—N⩗

H
—C = O , as in benzaldehyde;

H
—N = C—⟨O⟩ , as in benzalazine; and

—C≡N , as in acetonitrile.

The compound to which DTP or its homologues add can have more than one unsaturated bond, and the additive reaction may occur at one or more of such bonds.

The structural formula of DTP is:

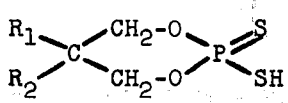

Accordingly, the generalized structure of the adduct can be represented as follows:

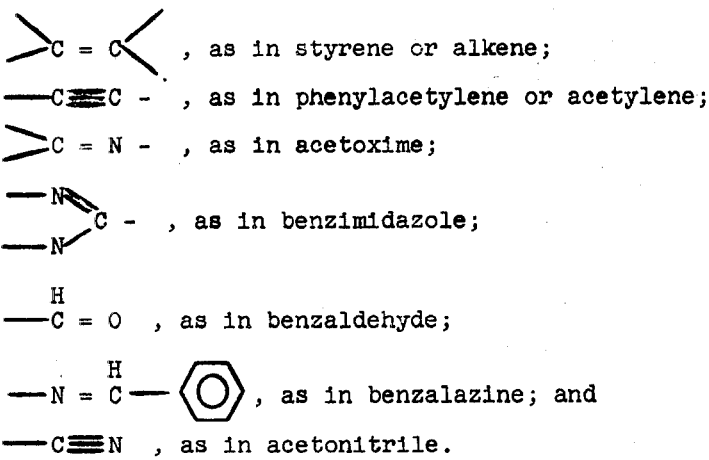

wherein $R_1$ and $R_2$ are alkyl groups which can be the same or different and each group can have from 1 to 5 carbon atoms, and wherein $x$ is 1 or 2, (O) portion represents the optional presence of an oxygen atom, and R is the after-addition moiety of the reactant to which DTP has been added. The R moiety can be alkyl except methyl, alkenyl, alkynyl, aralkyl except benzyl and alkyl-substituted aralkyl except alkyl substituted benzyl, an alicyclic radical (including polycyclic radicals) and the alkyl substituted derivatives thereof, and a heterocyclic radical containing one or more heteroatoms selected from sulfur, oxygen and nitrogen. R can also be

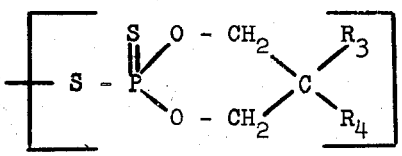

to give bis-diesters which are made by reacting two moles of DTP or its homologues with alcoholic iodine, in which case the optional oxygen is not present. $R_3$ and $R_4$ may have the same values as $R_1$ and $R_2$. Additionally, the R moiety can contain any of the following functional substituent groups:

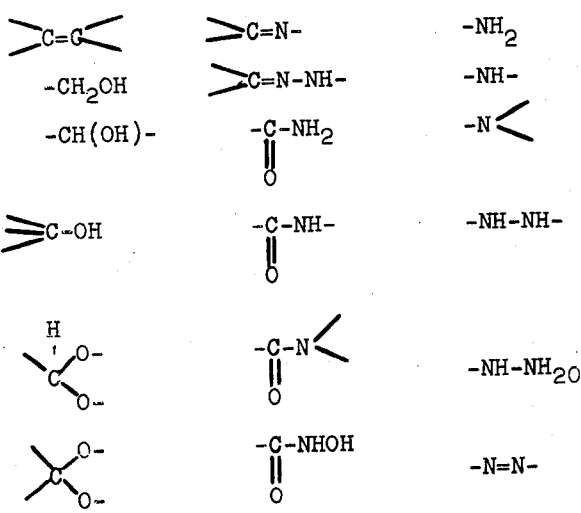

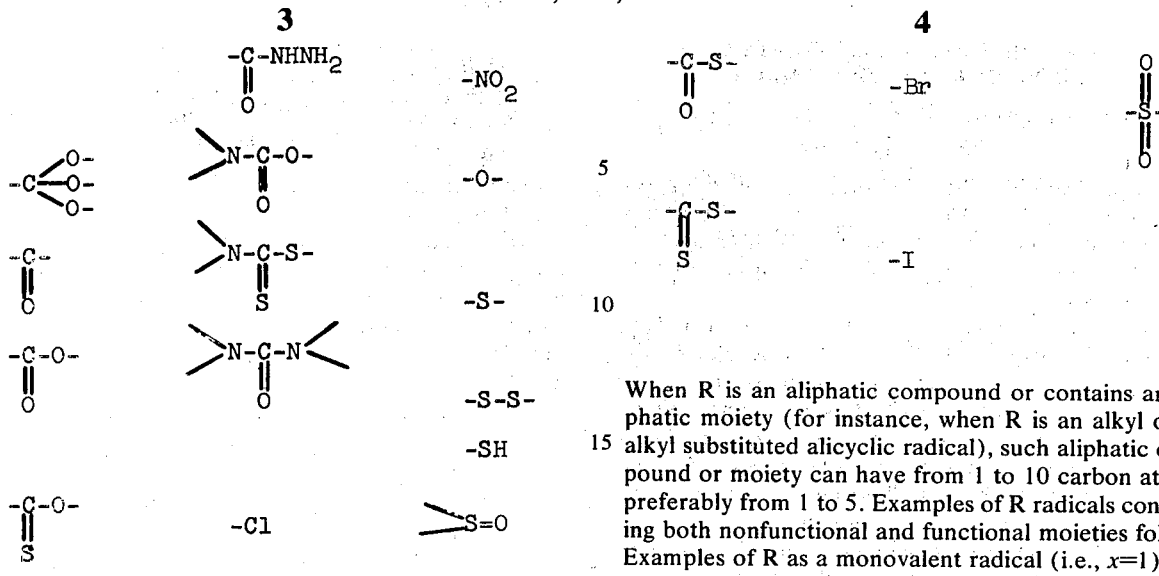

When R is an aliphatic compound or contains an aliphatic moiety (for instance, when R is an alkyl or an alkyl substituted alicyclic radical), such aliphatic compound or moiety can have from 1 to 10 carbon atoms, preferably from 1 to 5. Examples of R radicals containing both nonfunctional and functional moieties follow. Examples of R as a monovalent radical (i.e., $x=1$) are:

(1) 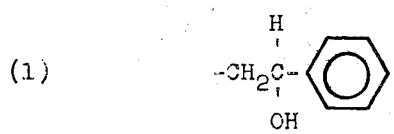

α-hydroxyphenethyl (2) 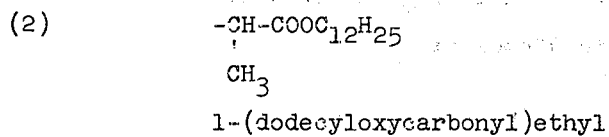

1-(dodecyloxycarbonyl)ethyl (3) -CH$_2$CH$_2$COOC$_{12}$H$_{25}$ 2-(dodecyloxycarbonyl)ethyl (4) 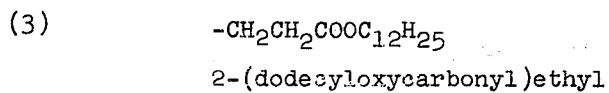

α-(benzylidenehydrazino)benzyl (5) 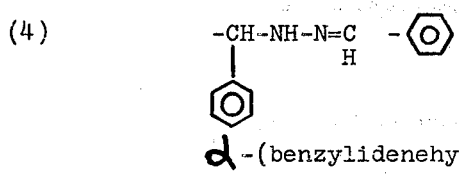

1,2,3a,4,7,7a-hexahydro-4,7-methanoinden-1-yl (6) 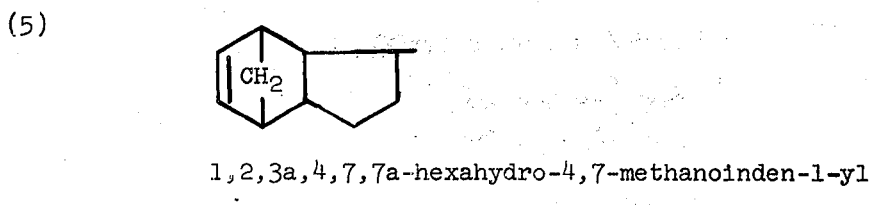

1,2,3a,4,7,7a-hexahydro-4,7-methanoinden-2-yl (7) 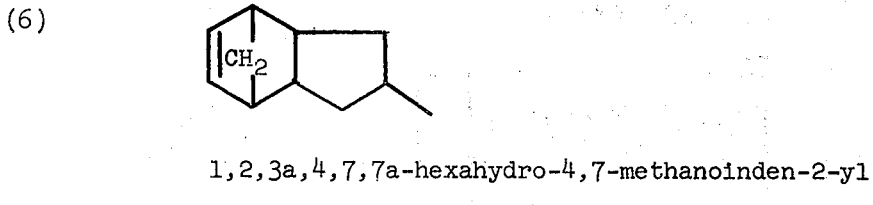

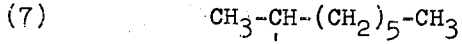

1-methylheptyl (8) 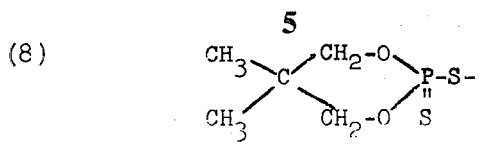

cyclic 2,2-dimethyltrimethylene-1,3-dioxyphosphorodithioyl (9) 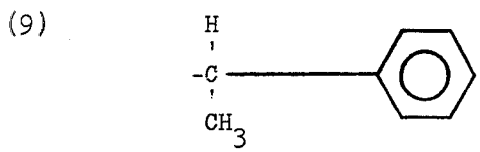

α-methylbenzyl

(10) 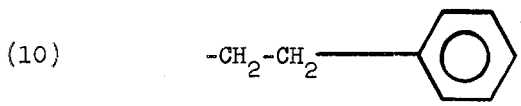

phenethyl

Examples of R as a divalent radical (i.e., x=2) are:

(1) 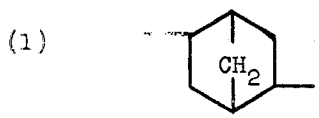

2,5-norbornylene (2) 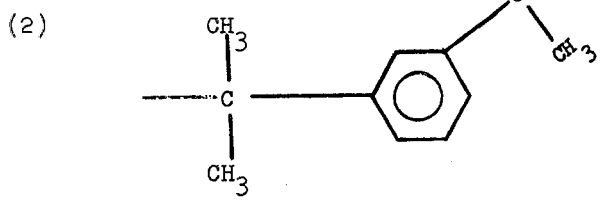

m-phenylenediisopropyl (3) 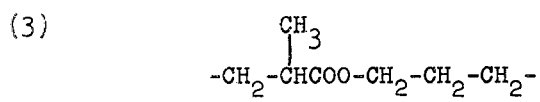

(2-methylethylene)carboxytrimethylene

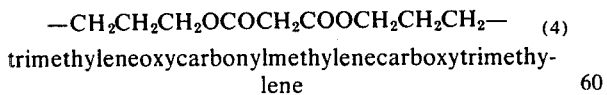 (4)
trimethyleneoxycarbonylmethylenecarboxytrimethylene

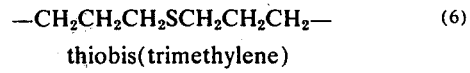 (6)
thiobis(trimethylene)

$C_6H_4-1,2(CO_2CH_2CH_2CH_2-)_2$ (5)
1,2—phenylenebis(carboxytrimethylene)

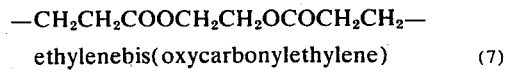
ethylenebis(oxycarbonylethylene) (7)

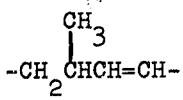

3-methyl-1-butenylene                                           (8)

—CH₂CH₂COOCH₂CH₂— ethylenecarboxyethylene                                         (9)

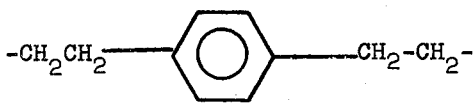

p-phenylenediethylene                                          (10)

—CH₂—CH₂—CH₂—CH₂— tetramethylene                                                 (11)

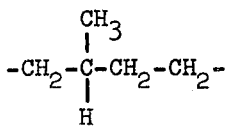

2-methyltetramethylene                                         (12)

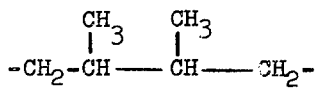

2-3-dimethyltetramethylene                                     (13)

-CH₂-CH₂-CONHCH₂-CH₂-CH₂-                                      (14)

ethylenecarbonyliminotrimethylene

-CH₂-CH₂-CH₂-OCH₂-CH₂-CH₂-                                     (15)

oxybis(trimethylene)

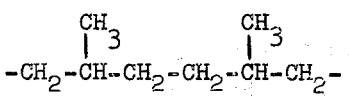

2,5-dimethylhexamethylene                                      (16)

Additional representative examples of R are ethyl, propyl, butyl, pentyl, vinyl, allyl, isopropenyl, butenyl, pentenyl, butynyl, pentynyl, phenethyl, phenylpropyl, phenylbutyl, phenylpentyl, naphthylmethyl, naphthylethyl, naphthylpropyl, naphthylbutyl, naphthylpentyl, cyclopropyl, cyclobutyl, cyclopentyl, cyclohexyl, decahydronaphthyl.

Representative examples of heterocyclic radicals containing one or more heteroatoms selected from sulfur, oxygen and nitrogen and dihydrothienyl, tetrahydrothienyl, 2,3-dihydrobenzothienyl, dihydrofuryl, dihydropyranyl, chromanyl, pyrrolinyl, piperidyl, indolinyl, indolidinyl, 1,3-dithiolanyl, 1,4-dioxanyl, imidazolinyl, imidazolidinyl, pyrazolidinyl, pyrazolinyl, dihydropyrazinyl, piperazinyl, dihydropyrimidinyl, dihydropyridazinyl, benzimidazolinyl, 1,2-dihydrobenzotriazolyl, dihydroquinolyl, 1,2-dihydroquinoxalinyl, dihydrooxathiinyl, thiazolinyl, isothiazolidinyl, dihydrobenzothiazolyl, oxazolidinyl, isoxazolidinyl, oxazolinyl, isoxazolinyl, dihydrooxazinyl, 2-benzoxazolinyl, oxadiazolidinyl, oxathiazolinyl.

Representative examples of alkyl substituted homologues of the aforementioned radicals are methylpropyl, methylbutyl, methylpentyl, ethylpropyl, ethylbutyl, ethylpentyl, 1,1,3,3-tetramethylbutyl, 4,4-dimethylhexyl, methylbutenyl, methylpentenyl, methylbutynyl, methylpentynyl, α-methylbenzyl, α-ethylbenzyl, α-propylbenzyl, α-butylbenzyl, methylphenethyl, ethylphenethyl, propylphenethyl, butylphenethyl, α-methylnaphthylmethyl, ethylnaphthylpropyl propylnaphthylbutyl, methylcyclohexyl, ethylcyclopropyl, propylcyclobutyl, methylphenycyclohexyl, ethyltetrahydronaphthyl, butyltetrahydronaphthyl.

Representative examples of alkyl substituted heterocyclic radicals are phenethyldihydrothienyl, methylbenzodihydrothienyl, propyldihydrofuryl, butyldihydropyranyl, isopropylchromanyl, butylpyrroinyl, ethylpiperidyl, ethylindolinyl, isopropylindolinyl, methyl-1,3-dithiolanyl, ethyltetrahydrothienyl, propyl-1,4-dithianyl, butyl-1,3-dioxolanyl, methyl-1,4-dioxanyl, ethylimidazolidinyl, propylimidazolidinyl, butylpyrazolidinyl, pentylpyrazolinyl, methylpiperazinyl, ethyldihydropyrimidinyl, propyldihydropyridazinyl, methyl-2,3-dihydrobenzimidazolyl, ethyltetrahydroquinolyl, propyltetrahydroquinolyl, propyldihydroquinoxalinyl, methyldihydrooxathiinyl, ethylthiazolinyl, propylisothiazolinyl, methyldihydrobenzothiazolyl, butyloxazolidinyl, pentylisoxazolidinyl, methyloxazolinyl, ethylisoxazolinyl, propyldihydrooxazinyl, methyldihydrobenzoxazolyl, propyloxadiazolinyl, butyloxathiazolinyl.

Of the O,O,S-triesters of phosphorodithioic acid which fall within the above general formula, many have been previously reported in the literature. J. H. Bartlett (U.S. Pat. No. 3,159,664) discloses, for instance, cyclic O,O-2,2-dimethyltrimethylene S-α-methylbenzyl phosphorodithioate and its method of preparation; and the compound bis(cyclic O,O-2,2-dimethyltrimethylene) dithiobis(phosphorothioate) has been reported by R. S. Edmundson in Tetrahedron, vol. 21, pp. 2379–2387, (1965). It should be understood, however, that these two compounds have not been previously described as accelerating agents within or without the temperature limits of the invention. Although synergistic combinations of thiazole accelerators and zinc phosphorodithioate O,O-diesters are known (see U.S. Pat. No. 3,308,103 to Coran), it will be hereinafter shown that such compounds are inferior accelerating agents compared with the compounds of the invention at the elevated curing temperatures of the inventive technique.

A new type of adduct disclosed herein is the result of the addition of DTP and its homologues to a

grouping. This is a new reaction previously unreported. This type of adduct is exemplified by cyclic O,O-2,2-dimethyltrimethylene S-[α-(benzylidenehydrazino)-benzyl] phosphorodithioate whose preparation is described in Example 7 below.

PREPARATION

The following examples illustrate the preparation of various adducts that are within the invention.

EXAMPLE 1

This example illustrates the preparation of cyclic O,O-2,2-dimethyltrimethylene S-α-methylbenzyl phosphorodithioate which is the Markovnikoff 1:1 mole addition product of cyclic O,O-2,2-dimethyltrimethylene phosphorodithioic acid and styrene.

10.4 g. (0.1 mole) of peroxide-free styrene was added dropwise during 5 minutes to a continuously stirred solution of 19.8 g. (0.1 mole) of cyclic O,O-2,2-dimethyltrimethylene phosphorodithioic acid in 200 ml. of reagent benzene at room temperature. The mixture was then stirred and refluxed for 9 hours. Evaporation of the solvent gave a liquid which crystallized very slowly. Recrystallization from cyclohexane gave a solid having a melting point of 84°–85.5°C. The yield of recrystallized product was 9.5 g. (31.5% of theory).

Analysis for $C_{13}H_{19}O_2PS_2$:
Cal'd. % C, 51.64; % H, 6.33; % P, 10.24; % S, 21.21.
Found. % C, 51.45; % H, 6.28; % P, 10.01; % S, 20.34.

The preparation of this particular adduct has been reported in the literature (U.S. Pat. No. 3,159,664 to J. H. Bartlett).

EXAMPLE 2

This example illustrates the preparation of the anti-Markovnikoff 1:1 mole addition product of cyclic O,O-2,2-dimethyltrimethylene phosphorodithioic acid and styrene.

A mixture of 20.8 g. (0.2 mole) of commercial grade styrene, 39.6 g. (0.2 mole) of cyclic O,O-2,2-dimethyltrimethylene phosphorodithioic acid in 100 ml. of reagent benzene and 0.697 g. (0.004 mole) of tertbutyl peroxypivalate (a 75% solution in mineral spirits) was stirred and heated at 45°C for 20 minutes and then was heated to reflux. Refluxing and stirring were continued for 7 hours. A 2 ml. portion of the reaction solution was evaporated to dryness and the residue after recrystallization from Skellysolve melted at 67°–71°C. A second recrystallization from Skellysolve raised the melting point to 72°–75°C. A third recrystallization from Skellysolve raised the melting point to 75.5°–77°C. A fourth recrystallization from Skellysolve raised the melting point to 76°–77.5°C. A mixed melting point with cyclic O,O-2,2-dimethyltrimethylene phosphorodithioic acid was 52°–59.5°C. The mixed melting point with a purified sample (melting point 84°–85.5°C) of the product of Example 1 (the Markovnikoff 1:1 adduct) was 57°–62°C.

Analysis for $C_{13}H_{19}O_2PS_2$:
Cal'd. % C, 51.64; % H, 6.33; % P, 10.24; Mol. wt = 302.4.
Found. % C, 51.63; % H, 6.37; % P, 10.36; Mol. wt = 303.0.

These mixed melting points and the analyses indicate that the product was neither the recovered dithioic acid nor the product from Example 1, but was the anti-Markovnikoff 1:1 mole addition product, viz., cyclic O,O-2,2-dimethyltrimethylene S-phenethyl phosphorodithioate.

EXAMPLE 3

This example illustrates the preparation of cyclic O,O-2,2-dimethyltrimethylene S-[1,2,3a,4,7,7a-hexahydro-4,7-methanoinden-2-yl] phosphorodithioate, which is the 1:1 mole adduct of dicyclopentadiene (3a,4,7,7a-tetrahydro-4,7-methanoindene) and cyclic O,O-2,2-dimethyltrimethylene phosphorodithioic acid (DTP).

39.6 g. (0.2 mole) of cyclic O,O-2,2-dimethyltrimethylene phosphorodithioic acid was dissolved at room temperature in 200 ml. of dry toluene contained in a 500 ml., 3-neck, round bottom flask equipped with a stirrer, thermometer, reflux condenser and dropping funnel. To the resultant solution, while stirring continuously, was added 25.4 g. (0.2 mole) of dicyclopentadiene through the dropping funnel during a period of 10 minutes. The ensuing exothermic reaction raised the temperature of the reaction mixture to about 52°C. in 10 minutes, the solution remaining colorless. After 24 hours at room temperature, the solution was placed in a beaker on a warm steam bath. As the solvent (toluene) evaporated, a white solid crystallized from solution. After 24 hours, the mixture was filtered to remove the white, solid product which weighed 54.6 g. After recrystallization from Skellysolve and airdrying, the melting point of the product was 113°–116°C. A second recrystallization from Skellysolve gave a product with a melting point of 113.5°–115.5°C.

Analysis for $C_{15}H_{23}O_2PS_2$ (1:1 mole adduct):
Cal'd. % C, 54.52; % H, 7.02; % P, 9.37; % S, 19.41.
Found. % C, 53.83; % H, 6.82; % P, 8.89; % S, 18.08.

An infrared spectrum of the above 1:1 mole adduct showed the complete absence of absorption at 1610 cm$^{-1}$, which is characteristic of the double bond between carbon atoms 2 and 3 in the following formula:

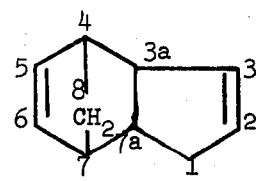

An absorption maximum was present, however, at 1575 cm$^{-1}$, which is characteristic of the double bond between carbon atoms 5 and 6, indicating that the DTP had added across the double bond between carbon atoms 2 and 3.

EXAMPLE 4

This example illustrates the preparation of cyclic O,O-2,2-dimethyltrimethylene S,S'-(bicyclo [2.2.1]heptane-2,5-diyl)phosphorodithioate, which is the 1:2 mole adduct of norbornadiene (bicyclo[2.2.1]2,5-heptadiene) and cyclic O,O-2,2-dimethyltrimethylene phosphorodithioic acid.

9.2 g. (0.1 mole) norbornadiene was added dropwise during 6–7 minutes to a continuously stirred solution of 39.6 g. (0.2 mole) cyclic O,O-2,2-dimethyltrimethylene phosphorodithioic acid in 150 ml. of reagent benzene at room temperature. An exothermic reaction caused the temperature of the mixture to rise to 58.5°C. When the temperature had dropped to 40°C., product began to crystallize from the reaction mixture. Filtration of the mixture gave 39.0 g. of product (79.9% of theory). The melting point (184°–194°C.) of the crude product was raised to 194°–195°C. by recrystallization from hot cyclohexane.

Analysis for $C_{17}H_{30}O_4P_2S_4$ (1:2 mole adduct):
Cal'd. % C, 41.79; % H, 6.19; % P, 12.68; mol. wt., 488.6.
Found. % C, 41.28; % H, 5.89; % P, 12.74; mol. wt., 459.0.

EXAMPLE 5

This example illustrates the preparation of cyclic O,O-2,2-dimethyltrimethylene S-1-methylheptyl phosphorodithioate, which is the adduct of 1-octene and cyclic O,O-2,2-dimethyltrimethylene phosphorodithioic acid.

11.2 g. (0.1 mole) of 1-octene was added to 19.8 g. (0.1 mole) of cyclic O,O-2,2-dimethyltrimethylene phosphorodithioic acid at room temperature. An exothermic reaction did not occur. After heating the reaction mixture at 100°C. for 8 hours, it was placed under reduced pressure (25–35 mm.) at a temperature of 75°–85°C. on a rotary evaporator for 2 hours. The residual, viscous liquid weighed 30.3 g. (98% of theory).

Analysis for $C_{13}H_{27}O_2PS_2$:
Cal'd. % C, 50.29; % H, 8.76; % P, 9.97; % S, 20.66.
Found. % C, 49.92; % H, 8.64; % P, 9.84; % S, 20.0.

EXAMPLE 6

This example illustrates the preparation of cyclic O,O-2,2-dimethyltrimethylene S,S'-[2,2'-(1,3-phenylene)diisopropyl] phosphorodithioate, which is the adduct of 2 moles of cyclic O,O-2,2-dimethyltrimethylene phosphorodithioic acid and one mole of m-diisopropenylbenzene.

15.8 g. (0.1 mole) of m-diisopropenylbenzene, which had been purified by passage through chromatographic alumina, was added dropwise while stirring for 6 minutes to a solution of 39.6 g. (0.2 mole) of cyclic O,O-2,2-dimethyltrimethylene phosphorodithioic acid in 150 ml. of reagent benzene at room temperature. A slightly exothermic reaction caused an elevation of 5°C. in the temperature of the reaction mixture. After stirring for one hour, the mixture was heated to, and maintained at, 60°–65°C., with continuous stirring, for 5 hours. Evaporation of the solvent left a crystalline product, covered with a thin layer of clear viscous syrup. The melting point of the crude solid, after washing with Skellysolve, was 111.5°–115°C. Recrystallization from a 4:1 mixture of cyclohexane and benzene gave 24.3 g. of product (43.8% of theory for a 2:1 adduct). Another recrystallization from a 5:1 mixture of Skellysolve and chloroform gave a product melting at 109.5°–116°C.

Analysis for $C_{22}H_{36}O_4P_2S_4$ (2:1 mole adduct):
Cal'd. % C, 47.62; % H, 6.54; % P, 11.17; % S, 23.12; mol. wt., 554.7.
Found. % C, 47.32; % H, 6.32; % P, 11.18; % S, 25.60; mol. wt., 582.0.

EXAMPLE 7

This example illustrates the novel preparation of cyclic O,O-2,2-dimethyltrimethylene S-[α-(benzylidenehydrazino)benzyl] phosphorodithioate, which is the adduct of 1 mole of cyclic O,O-2,2-dimethyltrimethylene phosphorodithioic acid to 1 mole of 1,2-di(benzylidene) hydrazine. 1,2-di(benzylidene)-hydrazine itself is the condensation product of 2 moles of benzaldehyde and 1 mole of hydrazine.

To a solution of 39.6 g. (0.2 mole) of cyclic O,O-2,2-dimethyltrimethylene phosphorodithioic acid in 150 ml. of reagent benzene was added, dropwise, with continuous stirring over a period of 5 minutes at 25°C., a solution of 20.8 g. (0.1 mole) of 1,2-di(benzylidene)hydrazine. The resultant mild exothermic reaction caused the temperature of the mixture to rise 5°C. and within 15 minutes a yellow precipitate began to form. Stirring was discontinued after a total of 2½ hours, after which the mixture was filtered to isolate the yellow product which had a melting point of 131.5°–135.5°C. Recrystallization of the yellow product from a mixture of 1 liter of cyclohexane and 0.5 liter of benzene gave 28.3 g. of product melting at 132°–135°C. A second recrystallization raised the melting point to 135°–136°C.

Analysis for $C_{19}H_{23}N_2O_2PS_2$ (1:1 mole adduct):
Cal'd. % C, 56.14; % H, 5.70; % P, 7.62; % S, 15.78.
Found. % C, 54.81; % H, 5.78; % P, 7.77; % S, 15.33.

The elemental analysis indicated that the product obtained was a 1:1 molar addition product of the phosphorodithioic acid and the azine. The yield of product before recrystallization was 37.3 g. or 91.9% of theory.

EXAMPLE 8

This example illustrates the preparation of cyclic O,O-2,2-dimethyltrimethylene S-(oxo)-α-hydroxyphenethyl phosphorodithioate. This is the 1:1:1 mole adduct of cyclic O,O-2,2-dimethyltrimethylene phosphorodithioic acid, styrene and oxygen.

To a solution of 39.6 g. (0.2 mole) of cyclic O,O-2,2-dimethyltrimethylene phosphorodithioic acid in 125 ml. of reagent benzene in a Parr oxygenator bottle was added 20.8 g. (0.2 mole) of styrene. The bottle was placed quickly into the oxygenator and 40 pounds of oxygen pressure from an oxygen cylinder was applied while shaking the reactants. Within 2 hours, a mild exothermic reaction occurred during the uptake of 0.129 moles of oxygen. The reaction mixture was cooled to room temperature. The solid product, weighing only 2.5 grams after drying, was filtered off. The reaction mixture filtrate was diluted with 145 ml. of toluene, washed with two 100 ml. portions of 8% aqueous sodium bicarbonate solution, one (1) 100 ml. portion of water, then freed of solvent and dried under reduced pressure (2 mm. at 70°C. for 2 hours). The weight of the very viscous, ambercolored, taffy-like residue was 37 g. (55.3% of theory).

Analysis for $C_{13}H_{19}O_4PS_2$:
Cal'd. % C, 46.69; % H, 5.73; % P, 9.26.
Found. % C, 48.41; % H, 5.62; % P, 9.02.

An infrared spectrum of the chemical, ($C_{13}H_{19}O_4PS_2$), showed absorption maxima at: (1) 3450 cm$^{-1}$ (presence of OH group); (2) 685 cm$^{-1}$ (presence of P=S grouping); (3) 1050 cm$^{-1}$ and 990 cm$^{-1}$ (presence of P—O—C grouping).

The reaction O.O-the previous example is not unique. Thus the addition of DTP according to the disclosure in the presence of oxygen under pressure results in the S-(oxo)-α-hydroxy- form of the resultant compound. For example, in the case of Example 5, O.O-2.2-dimethyltrimethylene S-(oxo)-2-hydroxy-n-octyl phosphorodithioate; and in the case of Example 10, lauryl 3-[cyclic O,O-2,2-dimethyl-trimethylene phosphorodithioyl(S-oxo)]-2-hydroxy-propionate.

EXAMPLE 9

This example illustrates the preparation of bis (cyclic O,O-2,2-dimethyltrimethylene) dithiobis(phosphorothioate).

To a solution of 39.6 g. (0.2 mole) of cyclic O,O-2,2-dimethyltrimethylene phosphorodithioic acid in 200 ml. of absolute methanol was added a solution of 25.4 g. (0.2 atomic weight) of iodine in 200 ml. of absolute ethanol at 25°C. in one portion with continuous stirring. The reaction mixture was stirred continuously for 48 hours, after which a solid product was isolated by filtration, washed with a small amount of absolute ethanol, and then air-dried. Recrystallization from ethanol solution yielded 9.1 gms. (23% of theory) of a white solid with a melting point of 135°–137°C.

Analysis for $C_{10}H_{20}O_4P_2S_4$:
Cal'd. % C, 30.45; % H, 5.11; % P, 15.70.
Found. % C, 30.77; % H, 5.24; % P, 15.02.

The preparation of this particular product has been reported in the literature (Tetrahedron, vol. 21, pp. 2379–2387, 1965).

EXAMPLE 10

This example illustrates the preparation of lauryl 2-(cylic O,O-2,2-dimethyltrimethylene phosphorodithioyl) propionate, which is the 1:1 mole adduct of cyclic O,O-2,2-dimethyltrimethylene phosphorodithioic acid to lauryl acrylate.

To a solution of 19.9 g. (0.1 mole) of cyclic O,O-2,2-dimethyltrimethylene phosphorodithioic acid in 70 ml. of methylene chloride was added 24 g. (0.1 mole) of lauryl acrylate in small portions over a period of about one-half hour. The reaction mixture was then refluxed for 2¼ hours and then washed successively with 50 ml. of saturated, aqueous sodium bicarbonate solution and 100 ml. of distilled water. The washed solution was then treated with Darco (activated charcoal), filtered and evaporated. The residual liquid was placed under reduced pressure (3 mm.) for 5 hours at 90°C. The weight of the clear viscous liquid was 36.2 g. (yield = 82.4% of theory, calculated as the 1:1 mole adduct). An infrared spectrum showed the absence of the vinyl unsaturation characteristic of the lauryl acrylate.

Analysis for $C_{20}H_{39}O_4PS_2$:
Cal'd. % C, 54.77; % H, 8.96; % P, 7.06.
Found. % C, 55.70; % H, 8.85; % P, 7.07.

The elemental analyses showed that the chemical was the 1:1 mole adduct as indicated above.

Use of the Triesters as Accelerators

In the process of vulcanizing rubbers, it is desirable to accelerate the vulcanization rate so that the production efficiency of a given size vulcanization unit can be increased. One approach to this result has been to raise the vulcanization temperature, but the resulting vulcanizates have shown themselves to be of inferior quality in several respects. The present compounds, on the other hand, are very good co-accelerators of the sulfur vulcanization process at elevated temperatures (i.e., at least about 350° to 400°F) when used in combination with such primary accelerators as the thiuram sulfides and disulfides, the dithiocarbamates and the thiazoles. It thus becomes possible to shorten the cure time very substantially. For example a 30 minute cure at 320°F. can be shortened to just 5 minutes at 400°F.

EXAMPLE 11

This example demonstrates the use of the chemicals of the invention. Normally they function as accelerators and generally can be used with any conventional accelerator, e.g., a thiazole, a dithiocarbamate, a thiuram monosulfide, a thiuram disulfide or a sulfenamide type accelerator.

| Code | Chemical Name |
| --- | --- |
| A | Tetramethylthiuram monosulfide |
| B | Zinc O,O-bis(4-methyl-2-pentyl) phosphorodithioate |
| C | Cyclic 0,0-2,2-dimethyltrimethylene S-α-methylbenzyl phosphorodithioate |
| D | Cyclic O,O-2,2-dimethyltrimethylene S-[1,2,3a,4,7,7a-hexahydro-4,7-methanoindene-2-yl] phosphorodithioate |
| E | Cyclic O,O-2,2-dimethyltrimethylene S,S'-(bicyclo[2.2.1]heptane-2,5-diyl) phosphorodithioate |
| F | Cyclic 0,0-2,2-dimethyltrimethylene S-1-methylheptyl phosphorodithioate |
| G | Cyclic 0,0-2,2-dimethyltrimethylene S,S'-[2,2'-(1,3-phenylene)diisopropyl] phosphorodithioate |
| H | Cyclic 0,0-2,2-dimethyltrimethylene S-[α-(benzylidenehydrazino)benzyl] phosphorodithioate |
| I | Cyclic 0,0-2,2-dimethyltrimethylene S-(oxo)-α-hydroxyphenethyl phosphorodithioate |
| J | Bis(cyclic 0,0-2,2-dimethyltrimethylene) dithiobis (phosphorothioate) |
| K | Lauryl 2-(cyclic 0,0-2,2-dimethyltrimethylene-phosphorodithioyl)propionate |

The compound formula (Base Formulation) used in this evaluation was:

| | Parts by Weight |
| --- | --- |
| Royalene 302* | 100.0 |
| HAF black | 50.0 |
| Circosol 2XH** | 25.0 |
| Zinc oxide | 5.0 |
| Stearic acid | 1.0 |
| Sulfur | 1.5 |
| 2-Mercaptobenzothiazole | 0.5 |
| | 183.0 |

*An ethylene-propylene-dicyclopentadiene terpolymer (EPDM) having an iodine number of 10, an ethylene-propylene ratio of 60–40 and a Mooney viscosity (ML-4 at 212°F.) of 90.
**A naphthenic-type oil; specific gravity = 0.9279. Saybolt viscosity at 210°F. = 61 seconds. Color ASTM, 2.5. Aniline point, 179°F.

Two known prior art accelerators appear as compounds A and B. A is Monex (tetramethylthiuram monosulfide) and B is a zinc diester of phosphorodithioic acid [zinc O,O-bis(4-methyl-2-pentyl) phosphorodithioate]. The particular zinc phosphorodithioate used for comparison purposes is one which in combination with MBT gives a synergistic effect when used to accelerate the sulfur vulcanization of ethylene-propylene terpolymers using a thiazole-type accelerator (U.S. Pat. No. 3,308,103 to Coran). Chemicals C to K are the nine chemicals whose preparation is given in the above examples 1, and 3–10, inclusive. Two different cures, viz., (1) a 30 minute cure at 320°F., and (2) a 5 minute cure at 400°F., were used. Stress-strain data, including Shore A hardness results, were obtained on test pieces which had been vulcanized in a press at the two different temperatures indicated.

mers of about 95 to 99 parts of isobutylene and correspondingly 5 to 1 parts of isoprene, the solution poly- Table I

| Stock | 1 | 2 | 3 | 4 | 5 | 6 | 7 | 8 | 9 | 10 | 11 | 12 | 13** |
|---|---|---|---|---|---|---|---|---|---|---|---|---|---|
| Base Formulation (MBT = 0.5) | 183 | 183 | 183 | 183 | 183 | 183 | 183 | 183 | 183 | 183 | 183 | 183 | 182.5 |
| Chemical | | | | | | | | | | | | | |
| A | 1.5 | | | | | | | | | | | | |
| B | | 3.0 | | | | | | | | | | | |
| C | | | 3.0 | | | | | | | | | | |
| D | | | | 3.0 | | | | | | | | | |
| E | | | | | 3.0 | | | | | | | | |
| F | | | | | | 3.0 | | | | | | | |
| G | | | | | | | 3.0 | | | | | | |
| H | | | | | | | | 3.0 | | | | | |
| I | | | | | | | | | 3.0 | | | | |
| J | | | | | | | | | | 3.0 | | | |
| K | | | | | | | | | | | 3.0 | | |
| Property | | | | | | For 30 Minute Cure at 320°F. | | | | | | | |
| Shore A | 59 | 55 | 47 | 52 | 52 | 47 | 57 | 56 | 52 | 53 | 34 | 47 | 46 |
| (1) Tensile, psi | 3210 | 3350 | 840 | 1730 | 820 | 940 | 2800 | 3230 | 1170 | 2880 | 245 | 1040 | 500 |
| (2) Elong., % | 510 | 570 | 1070 | 900 | 1000 | 980 | 640 | 640 | 1000 | 690 | 1140 | 950 | >1000 |
| (3) S-300, psi | 1170 | 915 | 210 | 325 | 210 | 215 | 700 | 710 | 245 | 575 | 90 | 225 | 130 |
| Bloom* | 2 | 1 | 1 | 1 | 1 | 1 | 1 | 1 | 1 | 1 | 1 | | |
| Property | | | | | | For 5 Minute Cure at 400°F. | | | | | | | |
| Shore A | 56 | 49 | 52 | 53 | 55 | 51 | 55 | 57 | 55 | 51 | 42 | | |
| Tensile, psi | 3220 | 1870 | 2760 | 2660 | 2620 | 2560 | 2850 | 2820 | 3190 | 2100 | 1750 | | |
| Elongation, % | 620 | 790 | 780 | 720 | 750 | 790 | 610 | 750 | 590 | 510 | 810 | | |
| S-300, psi | 820 | 405 | 525 | 525 | 455 | 465 | 735 | 805 | 525 | 690 | 260 | | |
| Bloom* | 3 | 4 | 1 | 1 | 1 | 1 | 2 | 2 | 2 | 1 | 1 | | |

*After one (1) week at room temperature: 1 = none; 2 = very slight; 3 = moderate; 4 = heavy
(1) = Tensile strength at break
(2) = Ultimate elongation
(3) = Modulus of elasticity at 300% elongation
** = Base formulation without 0.5 pt of MBT The results given in Table 1 show that the chemicals of the invention acting as co-accelerators give good high temperature (e.g. 400°F.) sulfur cures; substantially equivalent to the cures obtainable with prior art accelerators such as the thiuram sulfides and the zinc diesters of phosphorodithioic acid. The comparison of the high temperature (400°F.) cure with the standard temperature (320°F.) cure shows incipient reversion in the Monex stock (A) and appreciable reversion of the zinc diester stock (B). Stocks C to J show that adequate physical properties were developed after only 5 minutes at 400°F. with no evidence of reversion. It is obvious that satisfactory cures can be obtained at temperatures between 320°F. and 400°F. and above by proper adjustment of the cure time. An outstanding characteristic of the chemicals of this invention is that unlike the prior art accelerators they produce vulcanizates with very little or no bloom, thereby making them especially useful in injection molding formulations.

The accelerators of the invention can be used to accelerate the sulfur vulcanization of both low and high unsaturation rubbers.

Examples of low unsaturation rubbers are: (1) the EPDM rubbers prepared by interpolymerizing a monomeric mixture containing ethylene, a higher alpha monoolefin containing 3–16 carbon atoms and a polyene having two or more carbon-to-carbon double bonds. The preferred polyenes include dicyclopentadiene, 1,4-hexadiene, 1,3-pentadiene, cyclooctadiene, cyclooctatetraene, tridecadiene, 5-methylene-2-norbornene, 5-ethylidene-2-norbornene, 5-α-propylidene-2-norbornene, 5-isopropylidene-2-norbornene, 5-n-butylidene-2-norbornene, 5-isobutylidene-2-norbornene, 5-(2-methyl-2-butenyl)-2-norbornene, 5-(3-methyl-2-butenyl)norbornene and 5-(3,5-dimethyl-4-hexenyl)-2-norbornene; (2) the butyl rubbers which are copolymers of about 95 to 99 parts of isobutylene and correspondingly 5 to 1 parts of isoprene, the solution polymerization being effected at low temperature in the presence of a Friedel-Crafts polymerization catalyst of the type of aluminum chloride or boron trifluoride.

Examples of high unsaturation rubbers include natural rubber, synthetic rubbers, and mixtures thereof. The synthetic rubbers may be the products of the polymerization of various monomers. Such synthetic rubbers are: (1) polymers of butadienes such as 1,3-butadiene, 2-methyl-1,3-butadiene(isoprene), 2-chloro-1,3-butadiene (chloroprene), 2,3-dimethyl-1,3-butadiene piperylene, 1(or 2)-phenyl-1,3-butadiene and copolymers of mixtures thereof; and (2) copolymers of mixtures of one or more of such 1,3-butadienes with up to 70% of such mixtures of one or more monoethylenic monomers which contain a

group. Examples of such monoethylenic monomers include aryl olefins such as styrene, vinylnaphthalene, α-methylstyrene, p-chlorostyrene, the α-methylenecarboxylic acids and their esters, nitriles, and amides, such as acrylic acid, methyl acrylate, methyl methacrylate, acrylonitrile, methacrylonitrile, methacrylamide; methyl vinyl ether; methyl vinyl ketone; vinylidene chloride; vinylpyridines such as 2-vinylpyridine, 2-methyl-5-vinylpyridine; vinylcarbazole. Commercial synthetic rubbers of this type, made by aqueous emulsion polymerization with a peroxide catalyst, are SBR (copolymer of butadiene and styrene) and NBR (copolymer of butadiene and acrylonitrile). Some of these rubbers may be prepared by the solution polymerization of: (1) 1,3-butadiene using as catalyst the reaction product of aluminum trialkyl and titanium tetrachloride or (2) 2-methyl-1,3-butadiene(isoprene), using as catalyst the reaction product of aluminum trialkyl and titanium tetrachloride.

EXAMPLE 12

Results similar to those of example 11 are obtained when, isoprene (synthetic or natural), styrene-butadiene (SBR) and acrylonitrile-butadiene (NBR) rubbers are used in the inventive techniques.

The inventive accelerators are particularly useful in the production of vulcanized rubber articles reinforced with polyester (linear terephthalate polyester) fibers such as those described by Daniels in U.S. Pat. No. 3,051,212 and Chantry in U.S. Pat. No. 3,216,187. These rubber articles include pneumatic tires, V-belts, flat belts, "Timing" belts (toothed power or synchronizing belts), footwear, coated fabrics, rubberized-fabric containers, etc. When these articles are made using a rubber vulcanizing system with the so-called delayed action accelerators such as the thiurams or the sulfenamides, it has been found that these accelerators exert a deleterious effect on the polyester fiber reinforcement. This deleterious effect is accentuated when the article is subjected to elevated temperatures in service, such elevated temperatures arising from environmental heat and/or internal heat generated by repeated flexure as in the case of a pneumatic tire or a belt. Apparently these accelerators during the cure and/or in service form a basic environment which accelerates hydrolytic and/or chain scission of the polyester molecules which in turn causes degradation in the physical properties of the composite article.

The inventive accelerators are uniquely suited as co-accelerators in sulfur vulcanizing systems using thiuram or sulfenamide accelerators because at the elevated curing temperatures of about 400°F. they generate acidic products which can counteract the basic products of the thiuram or sulfenamide accelerators. This counteraction by the inventive accelerators results in a less basic environment which in turn greatly reduces the degradation of the polyester fiber reinforcement.

Typical sulfur-containing vulcanizing agents which are examplary of the vulcanizing agents to be used in the inventive technique are:

| Vulcanizing Agent | parts/100 parts rubber |
| --- | --- |
| Sulfur | 1.0 – 2.5 |
| Tuex (tetramethylthiuram disulfide) | 2.0 – 4.0 |
| Ethyl Tuex (tetraethylthiuram disulfide) | 2.5 – 4.5 |
| Vultac (alkyl phenol disulfides) | 5.0 – 12.0 |
| Sulfasan R (4,4-dithiodimorpholine) | 4.0 – 6.0 |

It should be understood that the particular sulfur-containing vulcanizing agent selected and the amount thereof used for vulcanization is not critical to the practice of the inventive technique; the type and quantity of vulcanizing agent used need only be that as would effect vulcanization under ordinary prior art conditions.

Typical prior art accelerators with which the inventive accelerators can be used are, in addition to MBT and MBTS:

Sodium 2-mercaptobenzothiazole
Zinc 2-mercaptobenzothiazole
2,2'-dithiobisbenzothiazole
2-(morpholinothio)-benzothiazole
2-benzothiazolyl 1-hexamethyleniminecarbodithioate
2-benzothiazolyl thiolbenzoate
1,3-bis(2-benzothiazolylmercaptomethyl)urea
2-(2,4-dinitrophenylthio)benzothiazole
S-(2-benzothiazolyl)N-diethyl dithiocarbamate
N-cyclohexylbenzothiazole-2-sulfenamide
N-tert-butylbenzothiazole-2-sulfenamide In general, the weight ratio of the inventive accelerator to the prior art accelerator is from 1:1 to 5:1, with about 2:1 preferred. The rubber compositions which can be cured with the inventive accelerators can contain the usual added additional ingredients, such as sulfur, pigments, antioxidants and/or antiozonants, fillers, extenders, etc. Curing temperatures can range from about 400°F. up to the highest permissible temperature depending upon such well-understood factors as the time of cure, and the type of rubber, prior art accelerator, activator, etc., used.

Of course, it is readily apparent to those skilled in the art, that there are variations of the invention which can be made without departing from its scope and spirit, and all such variations which basically rely on the teachings disclosed herein are considered to be within the scope of the foregoing description and appended claims.

Having thus described our invention, what we claim and desire to protect by Letters Patent is:

1. A compound having the following formula:

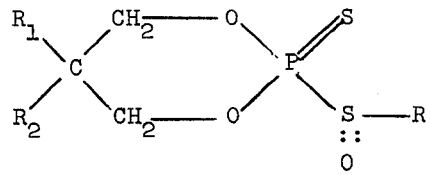

wherein $R_1$ and $R_2$ are $C_1$ to $C_5$ alkyl groups which can be the same or different; the O portion represents the optional presence of an oxygen atom; and R is α-hydroxyphenethyl.

2. A compound having the following formula:

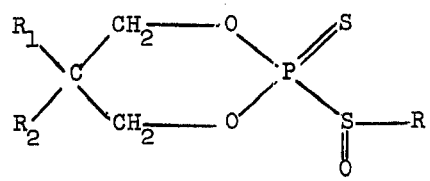

wherein $R_1$ and $R_2$ are $C_1$ to $C_5$ alkyl groups which can be the same or different; and R is α-hydroxyphenethyl.

3. The compound cyclic O,O-2,2-dimethyltrimethylene S-(oxo)-α-hydroxyphenethyl phosphorodithioate.

* * * * *